United States Patent [19]

Smith et al.

[11] 4,125,069

[45] Nov. 14, 1978

[54] CONTROL SYSTEM FOR REFUSE PELLETIZING PROCESS

[75] Inventors: George E. Smith, East Amherst; James D. Siefert, Orchard Park, both of N.Y.

[73] Assignee: Union Carbide Corporation, New York, N.Y.

[21] Appl. No.: 700,587

[22] Filed: Jun. 28, 1976

[51] Int. Cl.$^2$ .............................................. B30B 15/30
[52] U.S. Cl. ..................................... 100/45; 100/185; 425/145
[58] Field of Search .................... 425/145; 100/35, 45, 100/50, 41, 215, 209, DIG. 5, 43, 185

[56] References Cited

U.S. PATENT DOCUMENTS

| | | | |
|---|---|---|---|
| 1,879,367 | 9/1932 | Lotz | 425/145 |
| 2,621,364 | 12/1952 | Stillman | 425/145 |
| 2,984,173 | 5/1961 | Roche | 100/185 |
| 3,426,673 | 2/1969 | Miner | 100/DIG. 5 |
| 3,920,229 | 11/1975 | Piggott | 100/43 |

*Primary Examiner*—Billy J. Wilhite

*Attorney, Agent, or Firm*—Lawrence G. Kastriner; Warrick E. Lee, Jr.

[57] ABSTRACT

Disclosed herein is a control circuit employing instantaneous and delayed action bistable switching elements for use in controlling the flow of refuse in a multiple channel, extrusion type briquetting or pelletizing system wherein the refuse is supplied from a conveyor to a common chute feeding a pair of extrusion-type compactors. A vane arrangement in the common chute is driven in a reciprocating cyclical manner to feed the refuse in an alternating manner to the compactors. The control circuit disclosed herein senses the cyclical action of the reciprocating vane and controls in turn the conveyor system which supplies refuse to the chute. Certain deviating actions of the vane system indicate conditions signalling an incipient jam in the system flow. The control circuit, in sensing such actions and in concomitantly interrupting the feed of refuse, corrects the feed rate to alleviate the potential jam-producing conditions. Provisions are also included for interrupting refuse feed by excessive compactor pressure sensed by the control circuit.

6 Claims, 1 Drawing Figure

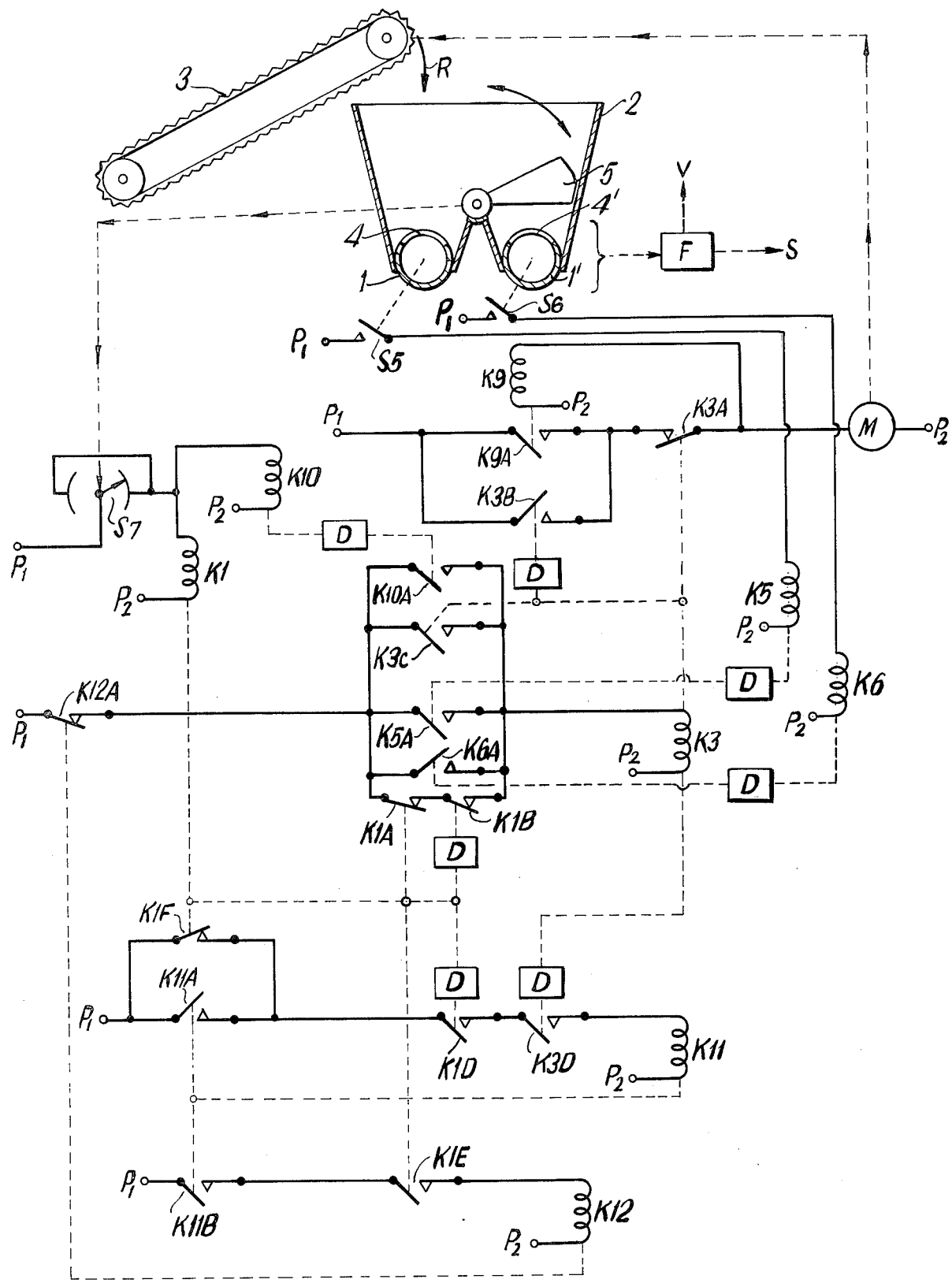

CONTROL SYSTEM FOR REFUSE PELLETIZING PROCESS

BACKGROUND

This invention relates in general to apparatus for pelletizing solid waste and more specifically to control systems which aid in the production of compacted shredded refuse to form a coherent pellet which remains intact as it is pyrolyzed in a vertical shaft furnace.

During the past several years considerable effort has gone into developing new technology for disposing of solid refuse in an environmentally acceptable manner and at the same time recovering, insofar as possible, the useful resources contained therein. One such process is described in U.S. Pat. No. 3,729,298 wherein solid refuse is fed directly into a vertical shaft furnace in which the combustible portion of the refuse is pyrolyzed — principally to a fuel gas consisting of carbon monoxide and hydrogen — and in which the uncombustible portion of the refuse is fluidized to molten metal and slag.

An improvement on the process described in the above-mentioned U.S. patent is described and claimed by J. E. Anderson in U.S. patent application Ser. No. 675,935, filed Apr. 12, 1976, now U.S. Pat. No. 4,042,345, incorporated herein by reference. This process requires that the refuse be compacted into pellets that are sufficiently strong to remain intact as they move down through the drying and pyrolysis zones of the furnace. Anderson has found that in order to have a refuse pellet which is sufficiently strong to remain coherent, i.e. intact, his process requires that it have a specified minimum density.

Anderson has also discovered that if the refuse pellets are sufficiently dense to have the necessary structural strength, then the drying and pyrolysis reactions become limited by the rate of heat transfer and diffusion within the pellets, and that in order to obtain a satisfactory process, the ratio of the surface area to the volume of the pellets should be greater than a specified minimum.

A system capable of producing pellets of these required characteristics is described in copending application Ser. No. 675,934, filed Apr. 12, 1976, now abandoned. Briefly and generally, this system illustratively employs a pair of parallel alternately actuated compactor tubes, each tube including: (1) a hydraulic ram housed at one end of the tube for compacting the refuse; (2) an inlet port at an intermediate section of the tube; and (3) a compacting section and outlet at the other end of the tube, from which the compacted pellets issue.

The inlet ports of the compacting tubes are supplied from a common chute fed from a refuse conveyor system, and of particular relevance to the invention herein, is the incorporation in such chute of a reciprocating member, e.g. a vane which cyclically sweeps the refuse in the chute alternatively to one compactor inlet port and then the other. Besides directing the refuse to each compactor, the cyclical feed member also performs a pre-packing function and serves to inhibit back flow from the compactor inlet port.

In addition, the reciprocating action of the cyclical feed member is a reflection of system flow and changes in such action signal an incipient jam, i.e., the occurrence or onset of a disruption in the flow of material through the multiple channel compactor. The present invention provides control means for exploiting the phenomenon to inhibit such jams.

Thus, the occurrence of a transient excess in the amount of refuse fed to the chute will, if of sufficient magnitude, alter the cyclical action of the vane. Although the vane will continue to oscillate, its period and/or displacement will be altered by the transient excess and these departures from the norm are detected by the control circuit, causing an interruption in the feed of refuse. This interruption in effect gives the vane an opportunity over succeeding cycles to dispose of the excess load by feeding it to the two compactors. As this is accomplished, the vane's periodicity and/or displacement return to normal. This is detected by the control circuit which thereupon restarts the refuse feed operation.

A similar sequence of events will be precipitated by a material increase of density in the refuse fed to the chute.

OBJECTS

It is an object of the invention to provide a control system for inhibiting jams in refuse pelletizing processes, and more particularly, to provide such a control system which is economical, reliable and of long term durability.

SUMMARY

Other objects and advantages will be apparent in the following description and in the practice of the invention which may be summarized as a control system for correcting conditions leading to incipient jams in refuse compacting apparatus having a refuse feed, a common chute supplied therefrom and cyclical feed means in the chute to alternatively feed multiple compacting channels, the control system including:

(1) input signalling means coupled to the cyclical feed means for supplying signals indicative of the operation of the cyclical feed means;

(2) drive means coupled to the refuse feed means;

(3) a control circuit connected to be supplied by the input signalling means and coupled to control the drive means in accordance with the signals received from said signalling means, whereby, abnormal operation of the cyclical feed means associated with incipient jams, produces a corrective action in the operation of the refuse feed means.

In addition to being supplied by the input signalling means, the control circuit also receives compactor pressure signals which when abnormal, lead to interruption of the refuse feed means.

THE DRAWING

The sole FIGURE is a schematic diagram illustrating an exemplary control system embodying the invention.

DETAILED DESCRIPTION

The refuse processor incorporating the control circuit includes a pair of hydraulically actuated extrusion tube compactors 1 and 1' which are fed refuse R from a common chute 2 via conveyor system 3 to form refuse pellets for conversion in furnace F to useful gaseous products V and inert solid residues S. Within chute 2 is a reciprocating vane system 5 which controls the delivery of refuse, feeding it alternatively to compactors 1 and 1' via their respective inlet ports 4 and 4'. Vane 5 is illustratively driven hydraulically and is synchronized with the operation of the compactors. Stoppage of the latter causes the vane to stop as well. A more detailed description of this and other applicable compacting systems will be found in the previously mentioned application, Ser. No. 675,934, which is incorporated herein by reference.

Referring to the control circuit, the principal input thereto is the oscillatory motion of vane 5. As symbolized by the dashed coupling line, a switch arrangement S7 is coupled to the vane system to sense the action of the vane, illustratively by providing a closed circuit condition when the vane is in either of its two extreme or end positions.

The output of the control circuit is manifested in the driving action of the motor M which drives conveyor 3 as schematically shown. By controlling motor M as hereinafter described to thereby control refuse feed, incipient jam conditions which alter the period and/or displacement of vane 5 are corrected. This is accomplished by providing interruptions in the flow of refuse through the system to give the vane and compactors additional time to process the refuse. As normal conditions return, the resultant return of the vane to normal action causes the feed system to restart.

THE MOTOR CONTROL CIRCUIT

Motor M has one terminal connected to power terminal P2 while its other terminal is supplied from power terminal P1 via the illustrated relay circuit. That circuit includes a normally-closed relay contact K3A serially connected to the parallel combination of a normally-open contact K9A and a normally-open, delayed action relay contact K3B. (All contacts subject to time delay are shown energized from their respective relay coils via a block labelled "D.") Relay contact K9A is a holding contact for motor M which is energized from holding relay K9 connected in parallel with motor M. Thus, whenever motor M is energized via contact sets K3B and K3A, relay K9 is energized thus closing holding contact K9A to keep motor M energized during those intervals when contact K3B is open.

To deenergize motor M and thus halt conveyor 3, the relay K3 must be energized to thus open contact set K3A. This actuation of relay K3 is controlled in turn from certain control and reset relays.

Thus, as illustrated, one side of the relay K3 is connected to power terminal P2 while the other side is connected to P1 through a network of relay contacts. This network includes a normally-closed contact K12A serially connected to the parallel, multi-branch combination of: (i) normally-open, delayed action contact K10A; (ii) normally-open contact K3C — this is a holding contact; (iii) the series combination of normally-closed contact K1A and delayed action, normally-closed contact K1B; (iv) normally-open contacts K5A and K6A.

It may be seen from the foregoing description, and assuming relay contact K12A is closed, that relay K3 which controls motor M, can be energized by suitable switching of the contacts in any one of the foregoing branches.

Taking first, normally opened contact sets K5A and K6A, these are controlled by respective relays K5 and K6 which are controlled in turn by respective pressure actuated switches S5 and S6, each of which is responsive to the pressure in the respective compactor tubes 1, and 1'. Conditions of excess pressure in either compactor causes actuation of the respective relay, K5 or K6, the resultant closing of the relay contact set (K5A or K6A) and the consequent energizing of K3 and shut-off of motor M.

Taking up now the principal sensing function, that of vane oscillation, it should be noted that K3 is also controlled by the serial set K1A, K1B and alternatively by K10A. The relays K1 and K10 which respectively control these contacts, are controlled by the vane-driven switch S7 such that both relays are energized when the vane 5 is in each of its end or extreme positions.

During normal operation of the vane, this periodic pulsing actuation of K1 and K10 does not cause actuation of K3 because of the delayed response of K10A and K1B. Thus, during a normal duty cycle, K10A cannot reach the closed condition before K10 deenergizes, i.e. before the vane leaves one end position to begin another traverse.

Similarly, during a normal duty cycle K1B does not achieve its closed condition because the delay time to close is longer than the period between the pulsing of relay K1.

As a consequence of the foregoing, and so long as normal cycling of vane 5 causes relays K1 and K10 to be pulsed at the normal rate, and provided an excess pressure condition does not occur in either compactor, then relay K3 is not energized and the operation of motor M is thus not interrupted.

IN TRANSIT DELAY OF VANE 5

Conditions indicating an incipient jam include a failure of vane 5 to reach either of its end positions at all or within a prescribed period. In such events, the cyclical energization of relays K1 and K10 will be interrupted. As a consequence of the failure to reenergize relay K1, its contact K1A will remain closed, and, provided the interruption lasts sufficiently long, its delayed-action contact K1B will also close.

With these contacts closed, and because normally-closed contact K12A is closed, the relay K3 will be energized. As a consequence, contact K3A thereof will open thus interrupting the energizing circuit to motor M thereby stopping refuse conveyor 3. Relay K9 in parallel with the motor will also drop out whereupon contact K9A will open. (Also note that relay contact K3B will close. This has no immediate effect on the motor since contact K3A is open. However, K3B which is a delayed action contact, remains closed for a delayed period of time after relay K3 is deenergized thus permitting the motor to be reenergized under the conditions described hereinafter, after which time holding contact K9A takes over from K3B.)

VANE DELAY AT END POSITION

A second less common condition indicating an incipient jam, is when the vane remains at either of its end positions beyond the prescribed time interval. In such an event, the energization of relays K1 and K10 will persist with the latter causing the ultimate closure of its contact K10A. With the closure of K10A, relay K3 is energized thereby deenergizing the motor in the manner previously described.

RESET FUNCTION

The control circuit is designed to provide the automatic restoration of normal refuse feed conditions through the actuation of motor M when the cycling actuation of vane 5 returns to normal. These restoring functions are achieved in part utilizing the reset relays K11 and K12.

Relay K11 is energized from source P1, P2 via normally-open, delayed action contact K3D, in series with normally-open, delayed action contact K1D, with that combination being connected in series with the parallel combination of normally-closed contact K1F and normally-open holding contact K11A.

The circuit for energizing K12 from source P1, P2 includes the series combination of normally-open contacts K1E and K11B. Accordingly, K12 cannot be energized unless K11 is energized. Also, when K12 is energized it opens contact K12A thus interrupting power to relay K3 causing, as previously explained, the restoration of power to motor M.

The following sequence of actions illustrates the resetting functions, it being noted that prior to such reset relay K3 is energized.

Assume vane 5 had been delayed in transit between end positions causing motor M to be deenergized, but that it finally reaches one of the end positions. Nothing occurs under these conditions until the vane then begins the traverse back to the other end position. When that occurs, relay K1 deenergizes and contact K1F closes. Also, relay contact K1D, because of its delayed action, remains closed notwithstanding K1 is deenergized. Also, K3 continues to remain energized and as a consequence contact K3D is closed. Under these described conditions, relay K11 is energized thus closing contact K11A to hold the relay energized, and also closing contact K11B in the circuit of relay K12.

When the vane finally reaches the opposite end position, and provided it does so within the normal time interval, i.e. before K1D opens, relay K1 is again energized causing contact K1E in the circuit of K12 to be closed. As a consequence, K12 is energized thereby opening its contact K12A to deenergize K3. As described previously, when K3 is deenergized, motor M is reenergized. Thus, the reciprocation of vane 5 through one cycle of operation in a correct manner after an abnormal condition causes the restoration of the refuse feed via operation of conveyor 3 from motor M.

To the foregoing description should be added the fact that a typical commercial embodiment will include other control elements and circuits for system start-up and shut down, for interlocking, for fail-safe features, and for other monitoring, signalling and control functions.

What is claimed is:

1. In multiple channel refuse compacting apparatus having a refuse feed and a common chute supplied therefrom, said chute including cyclical feed means to alternatively feed said multiple compacting channels, the improvement comprising a control system for correcting incipient jams, said control system including:
   (1) input signalling means coupled to said cyclical feed means for supplying signals indicative of the operation of said cyclical feed means;
   (2) drive means coupled to said refuse feed;
   (3) a control circuit connected to be supplied by said input signalling means and coupled to control said drive means in accordance with the signals received from said signalling means, whereby, abnormal operation of said cyclical means associated with incipient jams, produces a corrective action in the operation of said refuse feed.

2. Apparatus in accordance with claim 1 in which said input signalling means comprise pulse forming means for generating pulses having a repetition rate synchronized with the operation of said cyclical feed means.

3. Apparatus in accordance with claim 2 in which said control circuit includes means responsive to said pulse repetition rate for generating switching actions to control said drive means.

4. Apparatus in accordance with claim 1 in which said control circuit includes a network of instantaneous and delayed action switching elements interconnected to detect abnormal periods in the generation of said signals supplied from said input signalling means.

5. Apparatus in accordance with claim 4 in which said drive means comprise motor means switched on and off in accordance with the operation of said control circuit network.

6. Apparatus in accordance with claim 1 in which said input signalling means also include means for supplying signals indicative of pressure conditions in said channels, whereby said drive means are also responsive to said conditions.

* * * * *